United States Patent
Wu (10) Patent No.: US 7,222,527 B2
(45) Date of Patent: May 29, 2007

(54) AUTOMATIC LEVEL SENSING DEVICE USED IN MASSAGE TUB

(76) Inventor: Shang Neng Wu, 235 Chung-Ho Box 8-24, Taipei (TW)

(*) Notice: Subject to any disclaimer, the term of this patent is extended or adjusted under 35 U.S.C. 154(b) by 0 days.

(21) Appl. No.: 10/982,590

(22) Filed: Nov. 5, 2004

(65) Prior Publication Data
US 2005/0235748 A1 Oct. 27, 2005

(30) Foreign Application Priority Data
Apr. 23, 2004 (TW) .............................. 93111340 A (51) Int. Cl.
*G01F 23/24* (2006.01)
(52) U.S. Cl. .................. 73/304 R; 73/290 R
(58) Field of Classification Search .............. 73/304 R, 73/290 R
See application file for complete search history.

(56) References Cited
U.S. PATENT DOCUMENTS

| | | | | |
|---|---|---|---|---|
| 3,515,000 A | * | 6/1970 | Baumoel | 73/304 R |
| 3,848,627 A | * | 11/1974 | Page | 137/392 |
| 5,079,784 A | * | 1/1992 | Rist et al. | 4/541.2 |
| 5,829,069 A | * | 11/1998 | Morgan et al. | 4/493 |
| 6,227,808 B1 | * | 5/2001 | McDonough | 417/44.2 |
| 6,476,363 B1 | * | 11/2002 | Authier et al. | 219/481 |
| 6,643,108 B2 | * | 11/2003 | Cline et al. | 361/42 |
| 6,810,732 B2 | * | 11/2004 | Shon | 73/304 R |

* cited by examiner

*Primary Examiner*—Hezron Williams
*Assistant Examiner*—Rodney Frank (57) ABSTRACT

An automatic water level sensing device is used in a massage tub. The massage tube comprises: a plurality of water circulation devices and a switch; each water circulation device having at least one suction opening, at least one water outlet and a motor; the automatic water level sensing device comprising a first sensor head, a second sensor head, a sensor element and a CPU control element. The first sensor head and second sensor head are connected to the sensor element; the second sensor head is connected to the CPU control element; and the CPU control element is connected to the motor and the switch. The sensor element serves to detect a resistance between the first sensor head and second sensor head for acquiring a level of water in the massage tub.

1 Claim, 10 Drawing Sheets

AUTOMATIC LEVEL SENSING DEVICE USED IN MASSAGE TUB

FIELD OF THE INVENTION

The present invention relates to massage tubs, and particularly to an automatic level sensing device used in a massage tub, where water level in a massage tub can be detected automatically for protecting the massage tub.

BACKGROUND OF THE INVENTION

Figure 1:
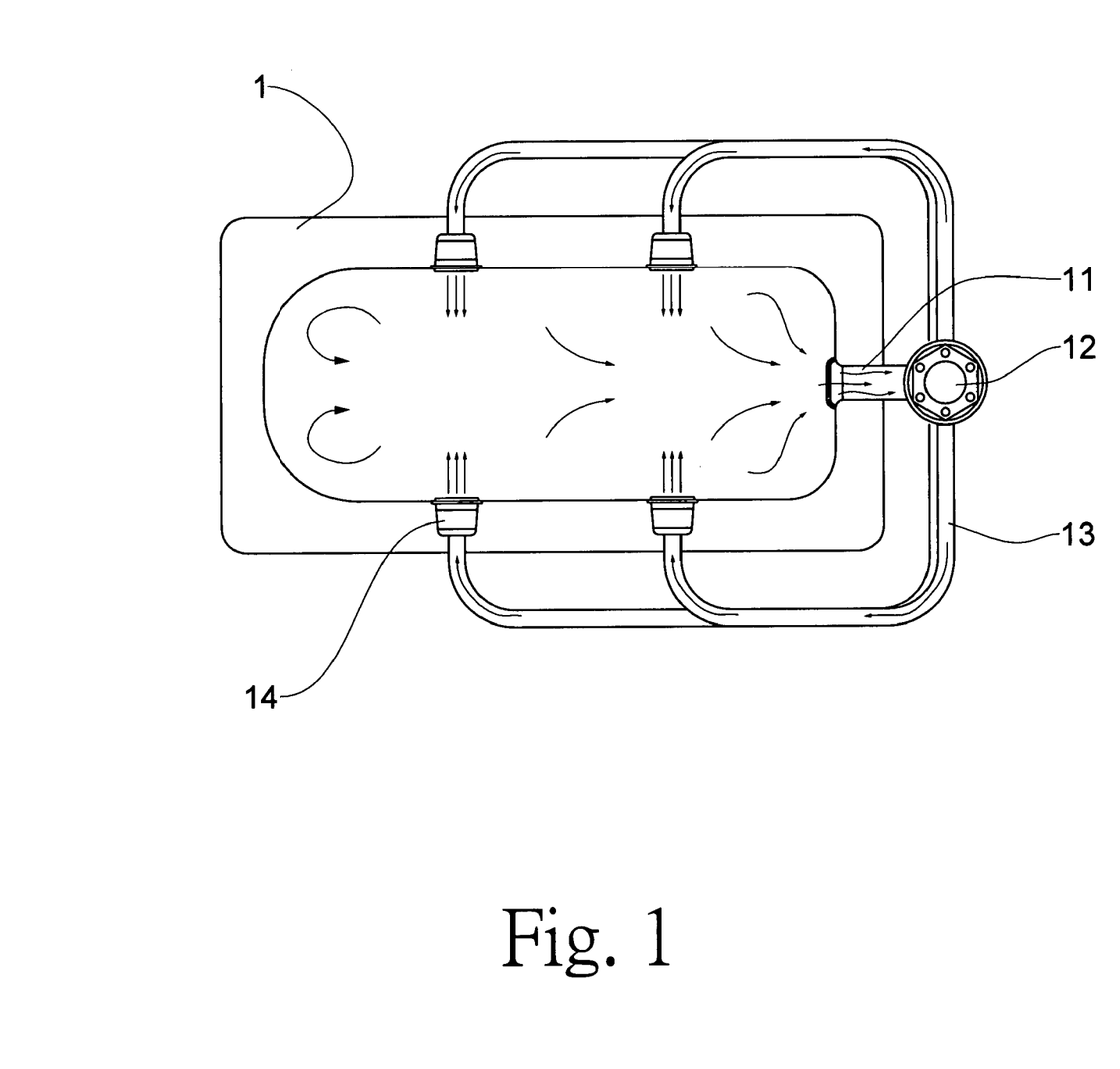
FIG. 1 is a structural schematic view about the prior art massage tub.
Figure 2:
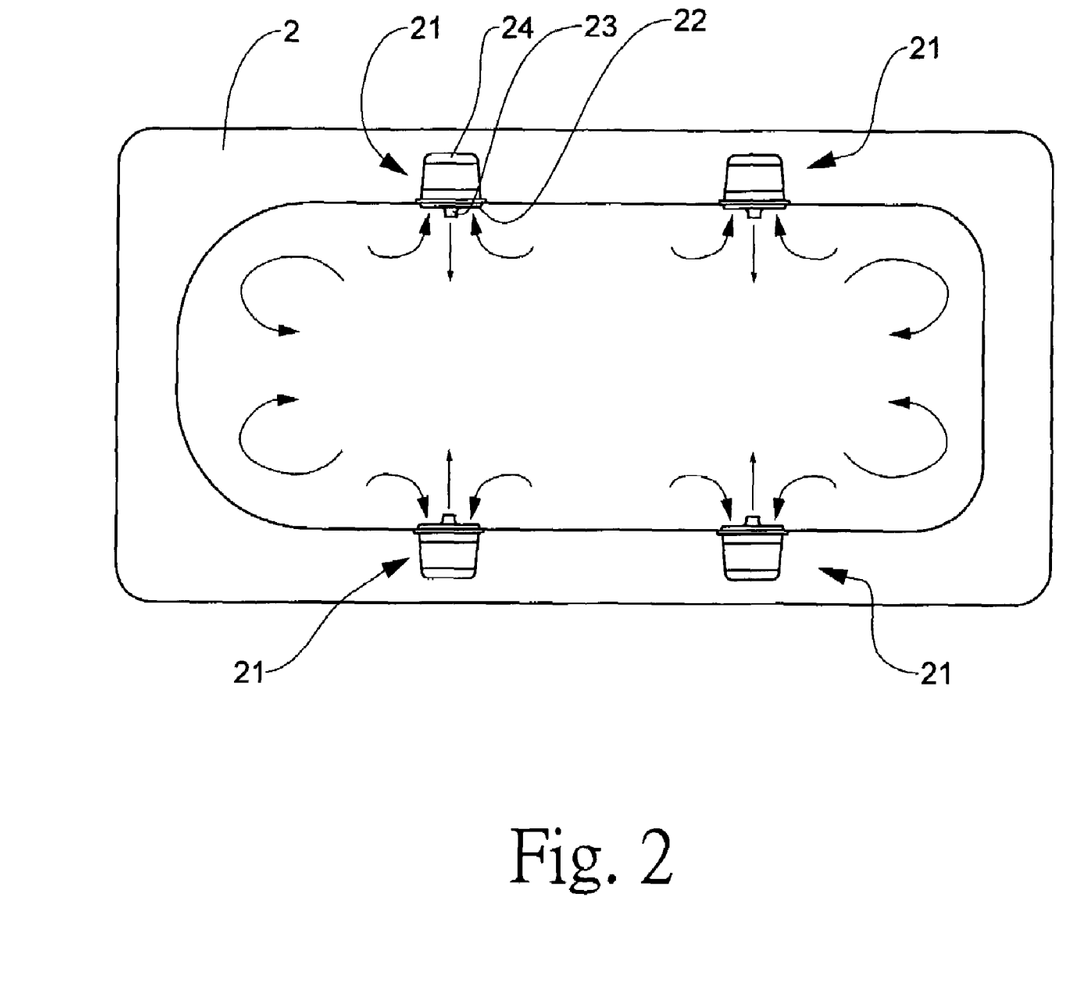
FIG. 2 is a structural schematic view about another prior art massage tub.

Referring to FIG. 1, a prior art massage tub is illustrated. The massage tub 1 is installed with a suction opening 11, a motor 12, a plurality of connecting pipes 13, and a plurality of water outlets 14. In use, the motor 12 is actuated so as to suck water from the suction opening 11. The water flows through the pipes 13 to the water outlets 14 for spraying out. Referring to FIG. 2, another prior art is illustrated. In each massage tub 2, a plurality of water circulation devices 21 are installed. Each water circulation device 21 has a suction opening 22, at least one water outlet 23, and motor 24. The water circulation devices 21 have no conventional pipe, which can be cleaned and maintained easily.

In use of the above mentioned prior art, when the level is higher than the suction opening, the suction opening will not suck water so that the motor rotates idly and thus it is possible that the motor will be burned out.

SUMMARY OF THE INVENTION

Accordingly, the primary object of the present invention is to provide an automatic level sensing device used in a massage tub, wherein water level in a massage tub can be detected automatically for protecting the massage tub.

To achieve above object, the present invention provide an automatic water level sensing device used in a massage tub. The massage tube comprises: a plurality of water circulation devices and a switch; each water circulation device having at least one suction opening, at least one water outlet and a motor; the automatic water level sensing device comprising a first sensor head, a second sensor head, a sensor element and a CPU control element. The first sensor head and second sensor head are connected to the sensor element; the second sensor head is connected to the CPU control element; and the CPU control element is connected to the motor and the switch. The sensor element serves to detect a resistance between the first sensor head and second sensor head for acquiring a level of water in the massage tub. When the water level is higher that elevations of the first sensor head and second sensor head, the CPU control element actuates the motor to operate according to the setting of the switch. If the water level is lower than one of the elevations of the first sensor head and second sensor head, the CPU control element will cause the motor to stop.

Furthermore, the present invention provides an automatic level sensing device used in a massage tub, wherein a massage tub having a suction opening, at least one water outlet, and a motor; the device comprising: a first sensor head, a second sensor head, a sensor element and a CPU control element. The first sensor head and second sensor head being connected to the sensor element. The second sensor head is connected to the CPU control element; and the CPU control element is connected to the motor and a switch.

The various objects and advantages of the present invention will be more readily understood from the following detailed description when read in conjunction with the appended drawing.

DESCRIPTION OF THE PREFERRED EMBODIMENT

In order that those skilled in the art can further understand the present invention, a description will be described in the following in details. However, these descriptions and the appended drawings are only used to cause those skilled in the art to understand the present invention, but not used to confine the scope of the present invention. The scope of the present invention is defined in the claims.

Figure 3:
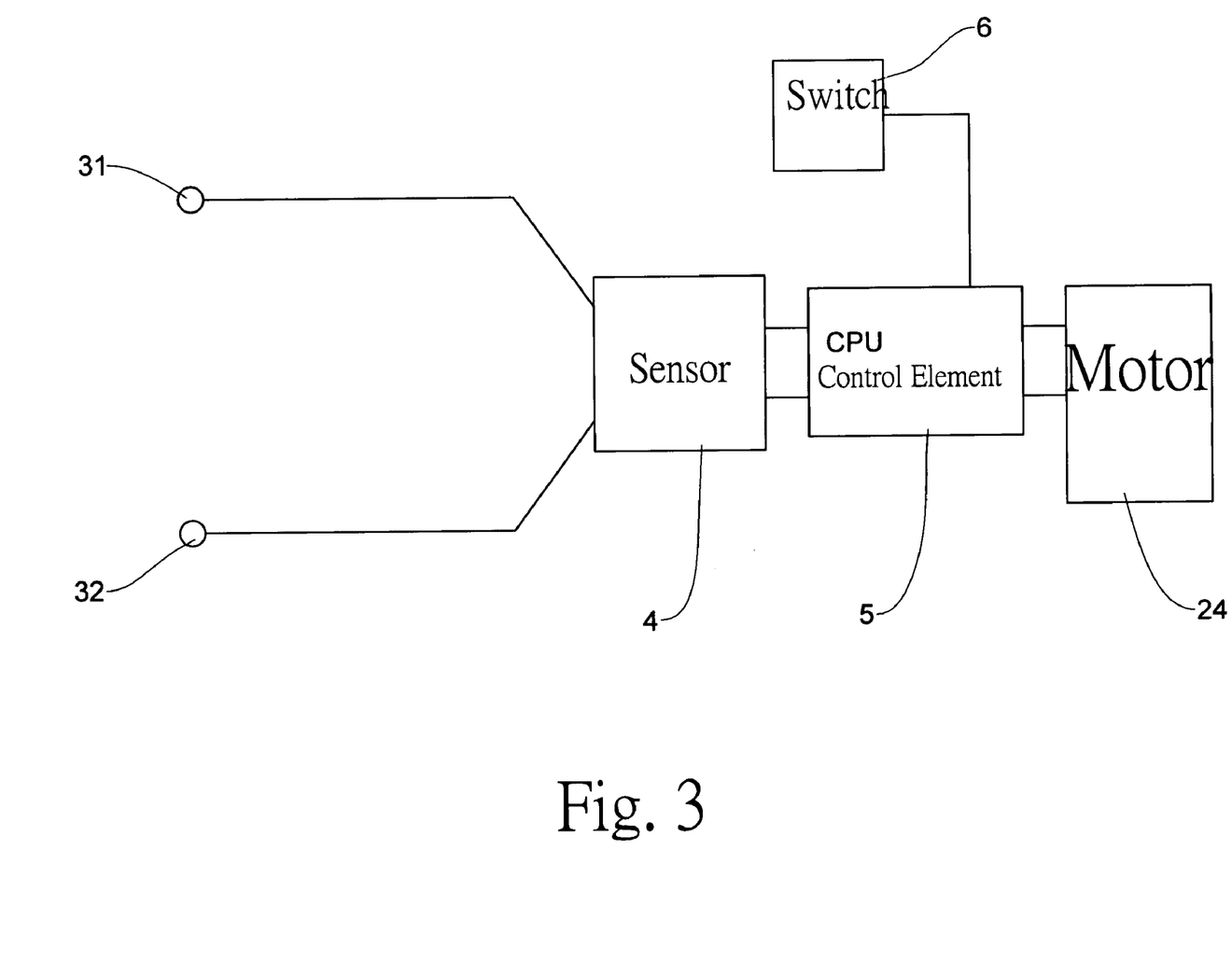
FIG. 3 is a structural schematic view of the present invention.
Figure 4:
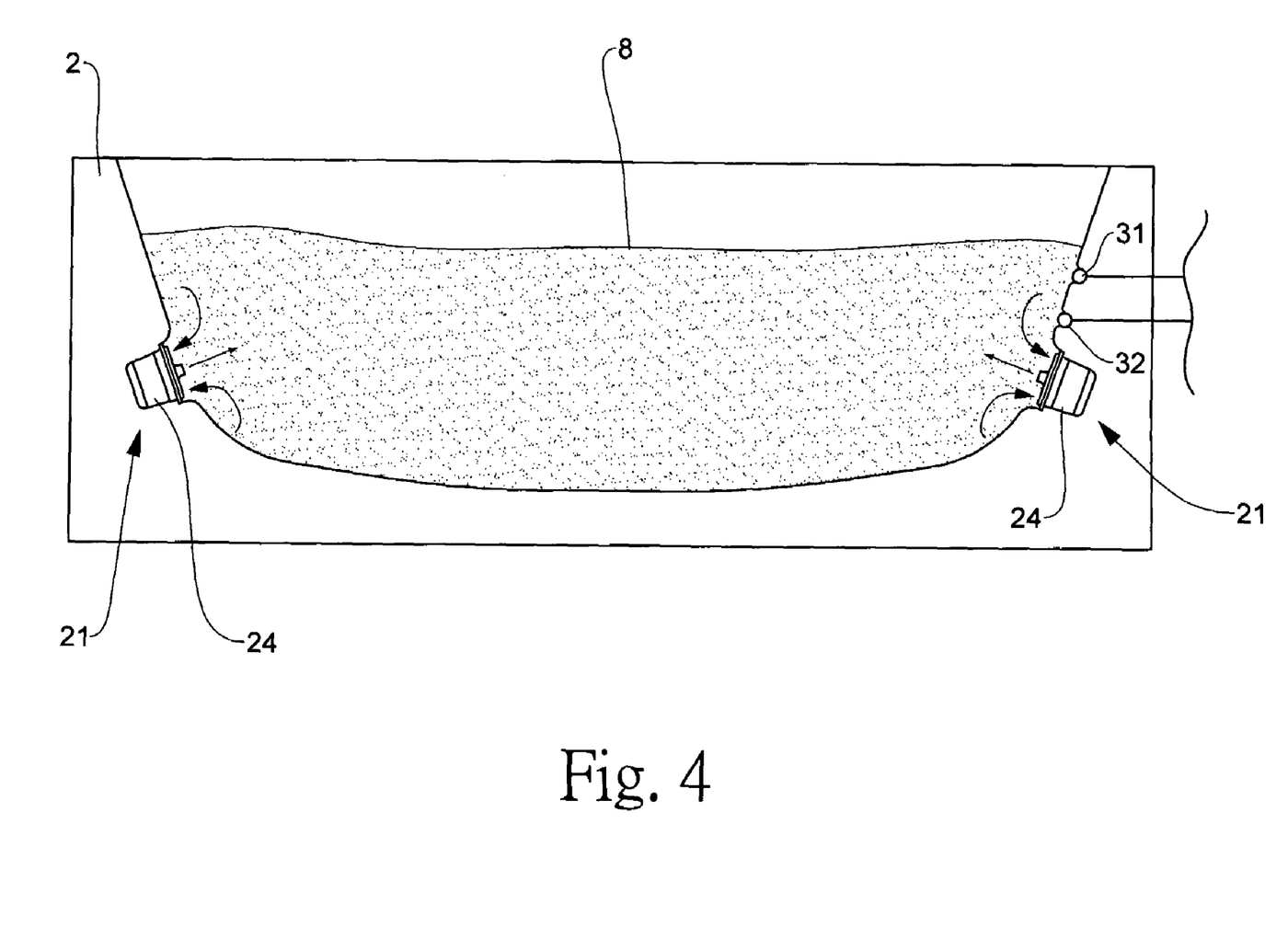
FIG. 4 is a schematic view showing the operation of the motor according to the present invention.

Referring to FIGS. 3 and 4, the structure of the present invention is illustrated. The present invention has the following elements.

A massage tub 2 is included.

A plurality of water circulation devices 21 is included. Each water circulation device 21 has at least one suction opening 22, at least one water outlet 23 and a motor 24.

An automatic water level sensing device includes a first sensor head 31, a second sensor head 32, a sensor element 4 and a CPU control element 5.

The first sensor head 31 and second sensor head 32 are installed to a wall of the massage tub 2 with an elevation higher than an elevation of a respective one of the water circulation devices 21. It is preferable that the first sensor head 31 and second sensor head 32 are installed in different elevations.

The first sensor head 31 and second sensor head 32 are connected to the sensor element 4 for sensing the resistances of the first sensor head 31 and second sensor head 32 so as to get the level of water in the massage tub 2.

Figure 5:
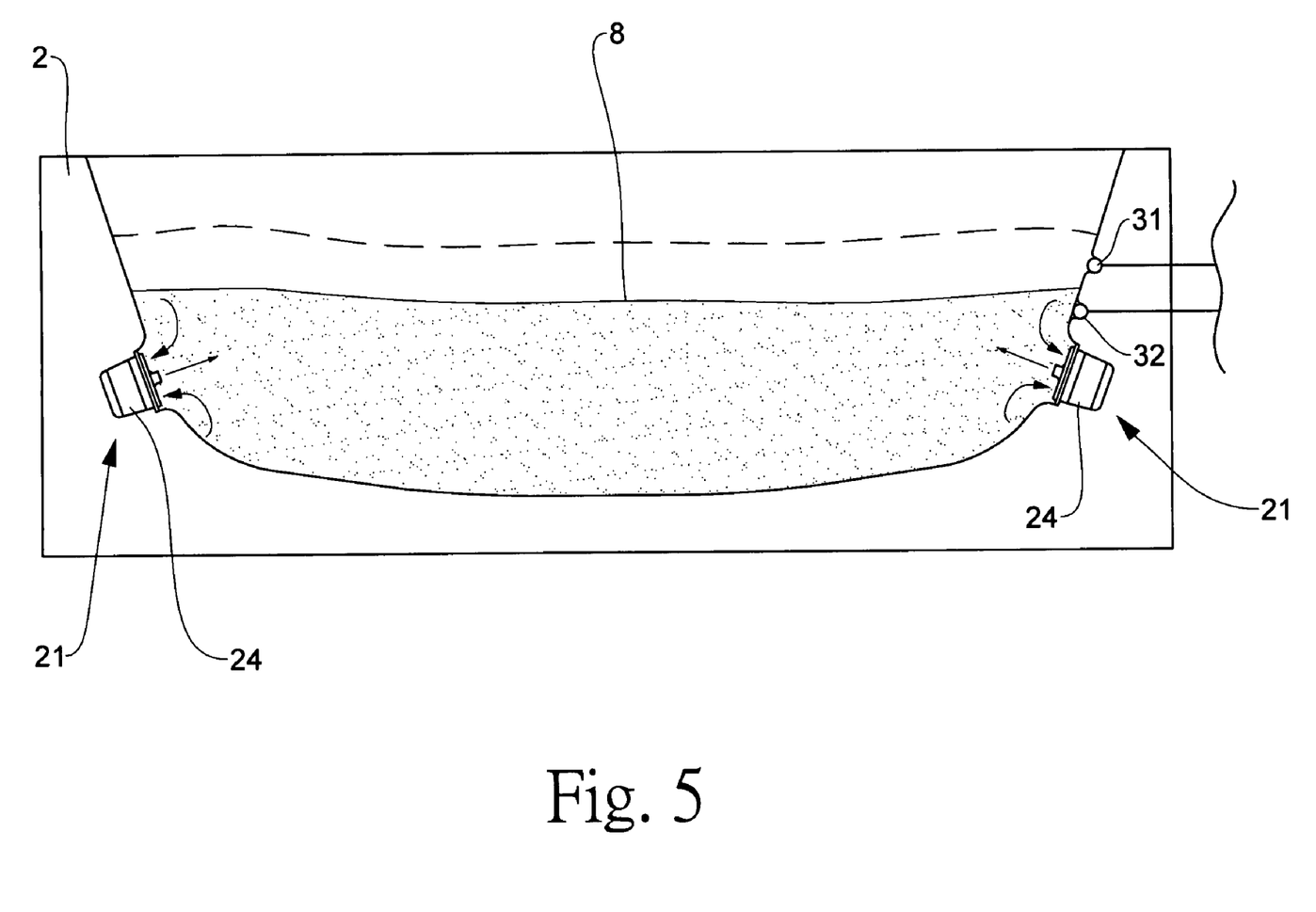
FIG. 5 is a schematic view showing another operation of the motor according to the present invention.
Figure 6:
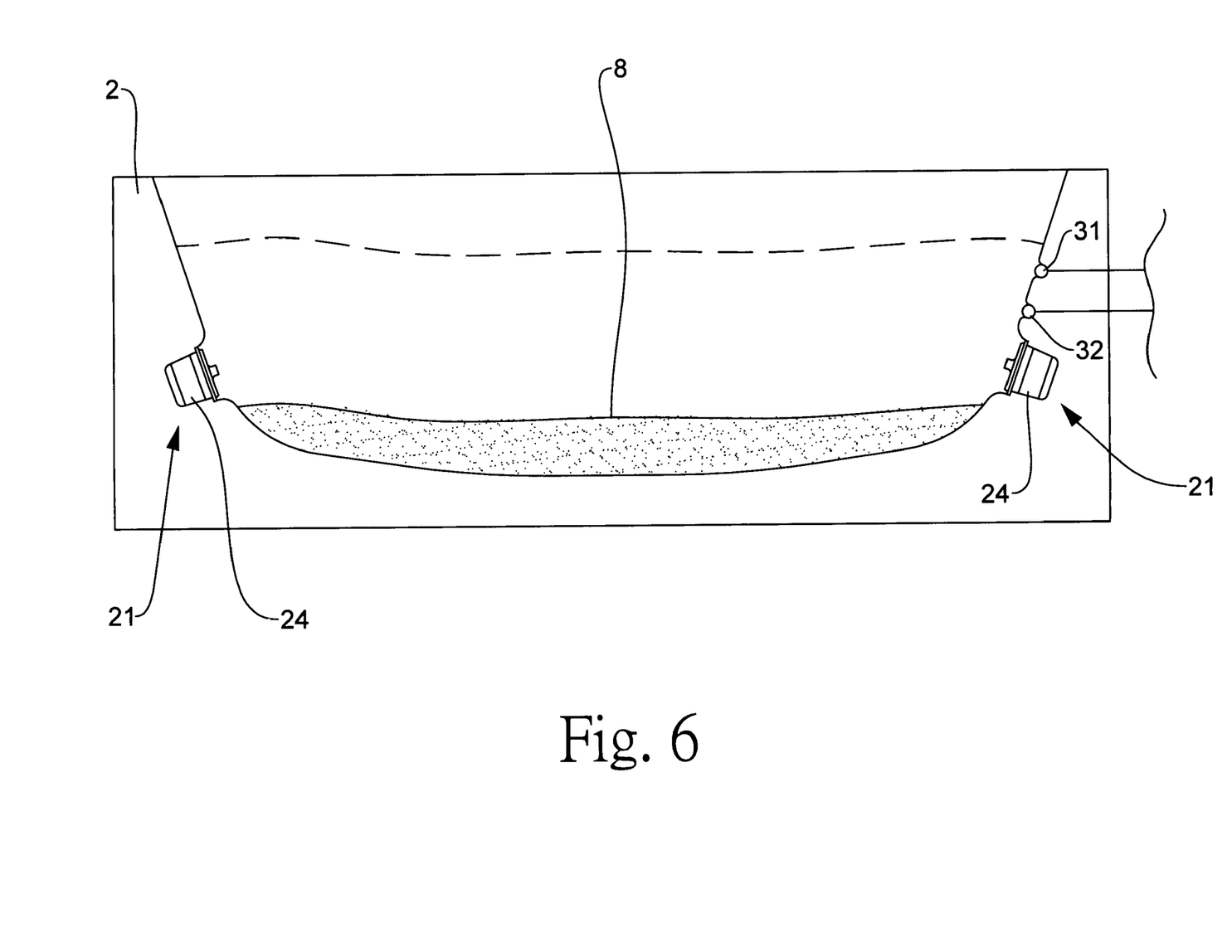
FIG. 6 is a schematic view showing a further operation of the motor according to the present invention.

Referring to FIG. 4, when the level 8 is higher that the elevation of the first sensor head 31 and the second sensor head 32, a resistance is got through the water, which is transferred to the CPU control element 5 through the sensor element 4 so that the motor 24 acts normally. On the contrary, when the level 8 is lower than the elevation of the first sensor head 31, as shown in FIGS. 5 and 6, since no water is between the first sensor head 31 and second sensor head 32, the resistance can not be got through the water. Therefore, the status will be transferred to the CPU control element 5 through the sensor element 4 so that the motor 24 stops.

Figure 7:
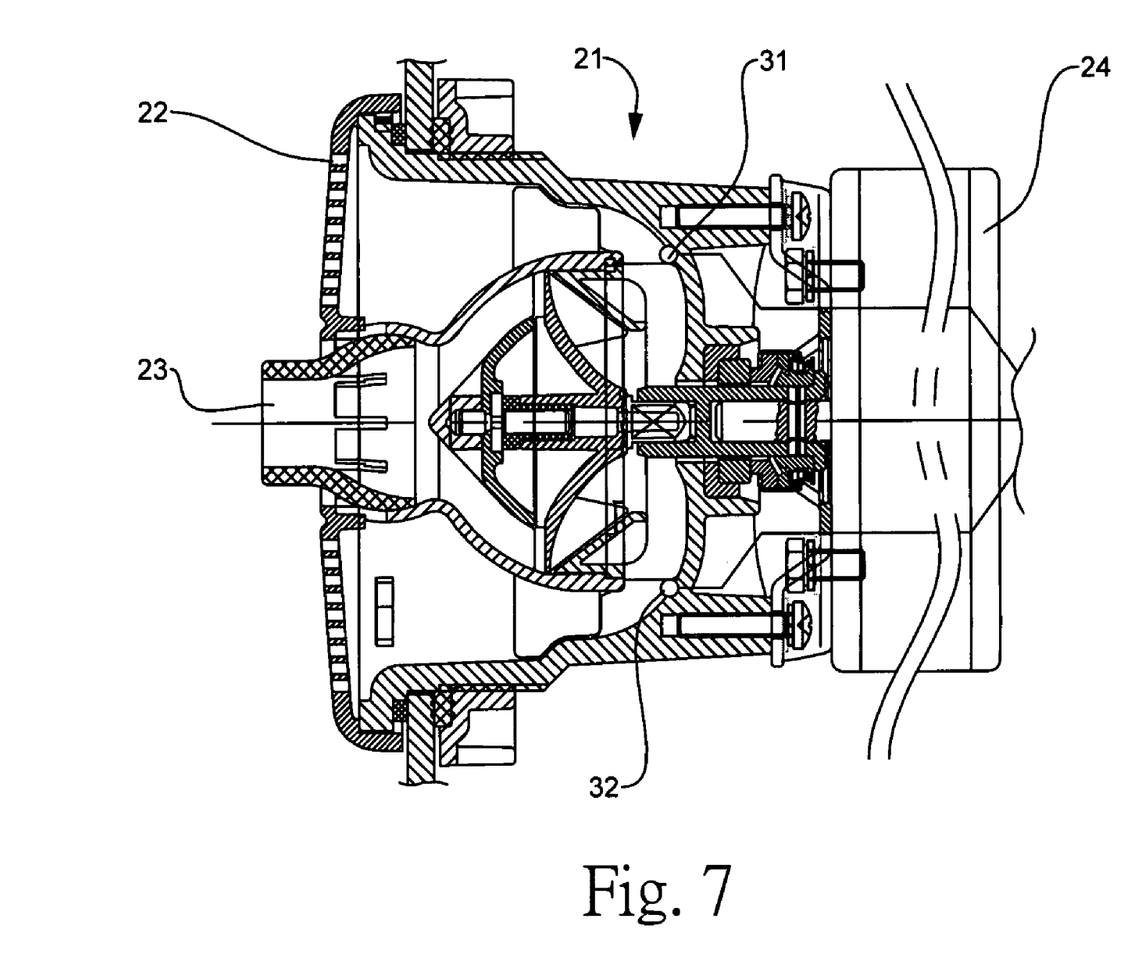
FIG. 7 is a cross sectional view showing that in the present invention, the sensing heads are installed in the water circulation device.
Figure 8:
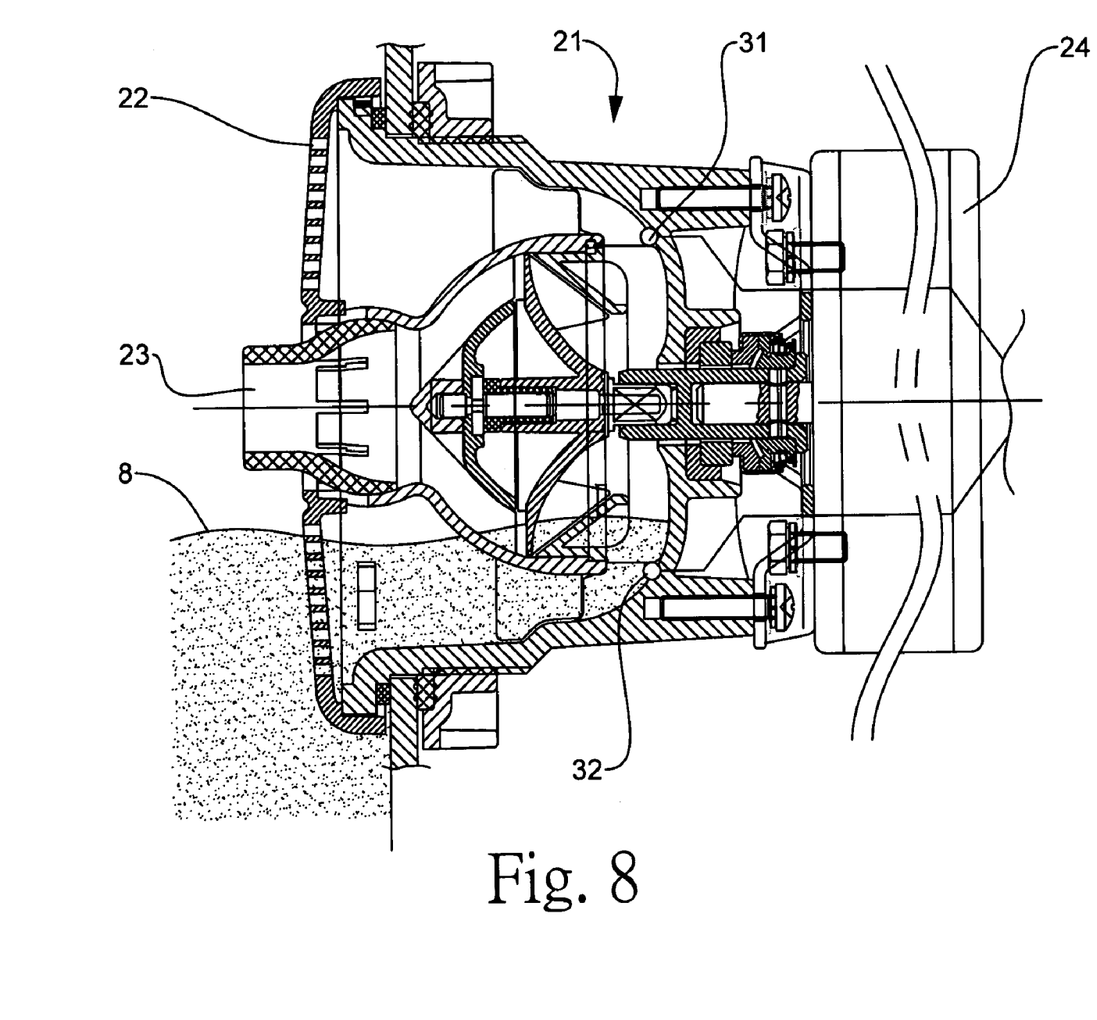
FIG. 8 is a cross sectional view showing a water circulation device where the sensing head is lower than the water circulation device.
Figure 9:
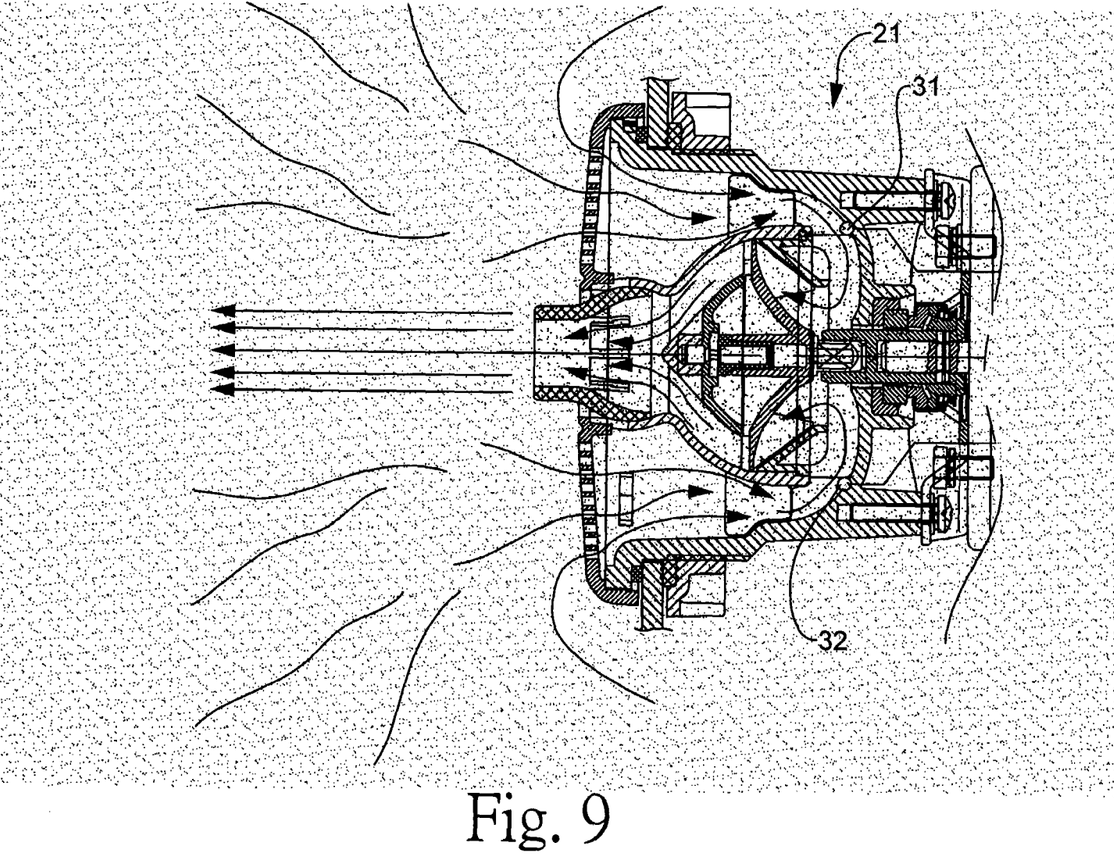
FIG. 9 is a cross sectional view showing a water circulation device wherein the sensing head is higher than the water circulation device.

With reference to FIG. 7, another embodiment of the present invention is illustrated. In this embodiment, the first sensor head 31 and second sensor head 32 are integrated to be installed in the water circulation device 21. Thereby the function of sensing water level automatically is realized. With reference to FIG. 8, at this state, the level 8 is between the first sensor head 31 and second sensor head 32, the status will be transferred to the CPU control element 5 through the sensor element 4. When the level 8 is higher than the elevations of the first sensor head 31 and second sensor head 32, as shown in FIG. 9, and the user opens the switch 6, the sensor element 4 and CPU control element 5 will allow the motor 24 to actuate.

Furthermore, the present invention can be installed to a massage tub having a suction opening, at least one water outlet, and a motor; the device comprising: an automatic water level sensing device includes a first sensor head, a second sensor head, a sensor element and a CPU control element; the first sensor head and second sensor head being connected to the sensor element; the second sensor head is connected to the CPU control element; and the CPU control element is connected to the motor and a switch. The automatic water level sensing device has the same function as aforementioned one.

Figure 10:
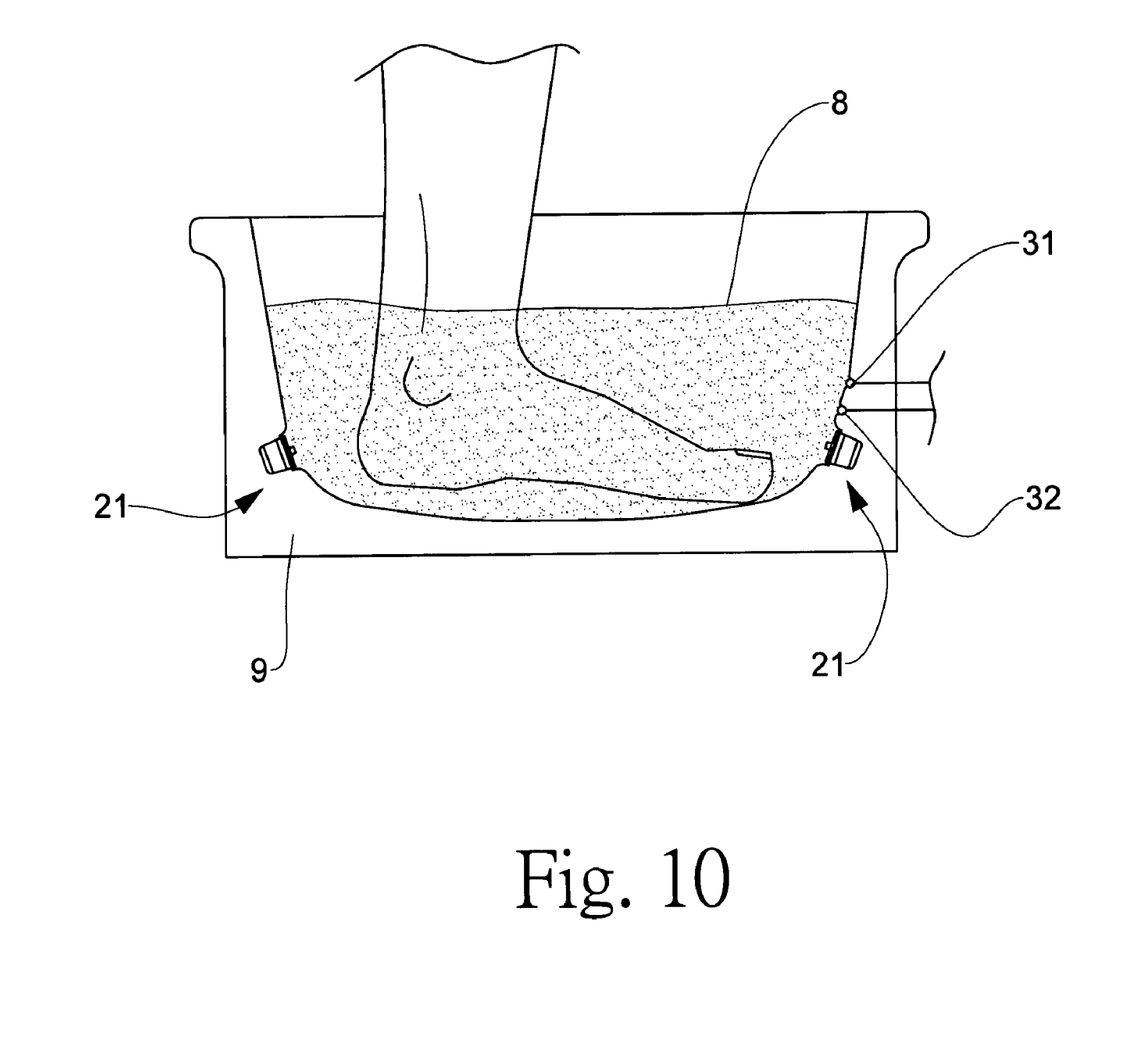
FIG. 10 is a schematic view showing that the present invention is used to a massage tub for legs.

Referring to FIG. 10, it is illustrated that the present invention is used to be as a massage tub 2 for legs.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A water circuit assembly with an automatic water level sensing device used in a massage tub; the assembly comprising:
   - a water circuit device having a plurality of suction openings, one water outlet and a motor, wherein the suction openings and the water outlet are arranged at the same side and the water outlet is at a middle section of the side; and the motor is arranged at another side opposite to the side having the suction openings and water outlet;
   - a first sensor head installed at an inner side of the water circulation device;
   - a second sensor head installed at an inner side of the water circulation device,
   - a sensor element and
   - a CPU control element;
   - wherein the first sensor head and second sensor head are connected to the sensor element; the second sensor head is connected to the CPU control element; and the CPU control element is connected to the motor and a switch; and
   - wherein the sensor element serves to detect a resistance between the first sensor head and second sensor head for acquiring a level of water in the massage tub; when the water level is higher than elevations of the first sensor head and second sensor head, the CPU control element actuates the motor to operate according to the setting of the switch; if the water level is lower than one of the elevations of the first sensor head and second sensor head, the CPU control element will cause the motor to stop.

* * * * *